US007216361B1

(12) United States Patent
Roskind et al.

(10) Patent No.: US 7,216,361 B1
(45) Date of Patent: May 8, 2007

(54) ADAPTIVE MULTI-TIER AUTHENTICATION SYSTEM

(75) Inventors: Jim Roskind, Redwood City, CA (US); Rory Ward, Sunnyvale, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 0 days.

(21) Appl. No.: 10/276,842

(22) PCT Filed: May 19, 2000

(86) PCT No.: PCT/US00/13890

§ 371 (c)(1),
(2), (4) Date: Nov. 19, 2002

(87) PCT Pub. No.: WO01/90859

PCT Pub. Date: Nov. 29, 2001

(51) Int. Cl.
*G06F 7/04* (2006.01)
*G06F 9/00* (2006.01)

(52) U.S. Cl. ............... 726/9; 726/10; 726/8; 726/11; 726/6; 726/7; 726/4

(58) Field of Classification Search ............... 726/2–6, 726/7–8, 10–11
See application file for complete search history.

(56) References Cited

U.S. PATENT DOCUMENTS 5,414,833 A * 5/1995 Hershey et al. ............... 726/22
5,684,951 A 11/1997 Goldman et al.
5,751,814 A 5/1998 Kafri (Continued)

FOREIGN PATENT DOCUMENTS

EP  1 197 828 A1  4/2002

(Continued)

OTHER PUBLICATIONS

Lunt; Knowledge-Based Intrusion Detection; Stanford University, Computer Science Department.

(Continued)

*Primary Examiner*—Norman M. Wright
(74) *Attorney, Agent, or Firm*—Michael A. Glenn; Glenn Patent Group

(57) ABSTRACT

An adaptive multi-tier authentication system provides secondary tiers of authentication which are used only when the user attempts a connection from a new environment. The invention accepts user input such as login attempts and responses to the system's questions. User login information such as IP address, originating phone number, or cookies on the user's machine are obtained for evaluation. User/usage profiles are kept for each user and the user login information is compared to the information from the user/usage profile for the specific user which contains all of the user information that the user used to establish the account and also the usage profile detailing the user's access patterns. The trust level of the current user login location is calculated and the invention determines if any additional questions to the user are required. If the trust level is high, then the user is granted access to the system. If the trust level is not high enough, then questions are sent to the user and the user's answers are evaluated and access is granted or denied based on the trust level and answers. The user's profile is updated to reflect the access attempt.

18 Claims, 3 Drawing Sheets

U.S. PATENT DOCUMENTS

| | | | |
|---|---|---|---|
| 5,875,296 A | 2/1999 | Ault et al. | |
| 6,199,113 B1* | 3/2001 | Alegre et al. | 709/229 |
| 6,334,121 B1* | 12/2001 | Primeaux et al. | 706/62 |
| 6,343,280 B2* | 1/2002 | Clark | 705/55 |
| 6,640,238 B1 | 10/2003 | Bowman-Amuah | |
| 6,658,091 B1 | 12/2003 | Naidoo et al. | |
| 6,691,232 B1* | 2/2004 | Wood et al. | 726/6 |
| 6,988,208 B2* | 1/2006 | Hrabik et al. | 726/23 |
| 2001/0034847 A1 | 10/2001 | Gaul | |
| 2001/0056405 A1 | 12/2001 | Muyres | |
| 2002/0042884 A1 | 4/2002 | Wu | |
| 2003/0041141 A1 | 2/2003 | Abdelaziz | |
| 2004/0024851 A1 | 2/2004 | Naidoo | |
| 2004/0041910 A1 | 3/2004 | Naidoo | |
| 2004/0064568 A1 | 4/2004 | Arora | |
| 2004/0064693 A1 | 4/2004 | Pabla | |
| 2004/0086088 A1 | 5/2004 | Naidoo | |
| 2004/0086089 A1 | 5/2004 | Naidoo | |
| 2004/0086090 A1 | 5/2004 | Naidoo | |
| 2004/0086091 A1 | 5/2004 | Naidoo | |
| 2004/0088347 A1 | 5/2004 | Yeager | |
| 2004/0088369 A1 | 5/2004 | Yeager | |
| 2004/0093268 A1 | 5/2004 | Ramchandani | |
| 2004/0199770 A1* | 10/2004 | Roskind | 713/176 |
| 2005/0132060 A1 | 6/2005 | Mo | |
| 2005/0187934 A1 | 8/2005 | Motsinger | |
| 2005/0188079 A1 | 8/2005 | Motsinger | |
| 2005/0188080 A1 | 8/2005 | Motsinger | |
| 2005/0188222 A1 | 8/2005 | Motsinger | |
| 2005/0188423 A1 | 8/2005 | Motsinger | |
| 2005/0198099 A1 | 9/2005 | Motsinger | |
| 2005/0203773 A1 | 9/2005 | Soto | |

FOREIGN PATENT DOCUMENTS

| | | |
|---|---|---|
| WO | WO 98/51029 | 11/1998 |
| WO | WO 98 51029 A | 11/1998 |
| WO | WO 99 65207 | 12/1999 |
| WO | WO 99/65207 | 12/1999 |
| WO | WO 2004/114082 A2 | 12/2000 |
| WO | WO 01/38999 A1 | 5/2001 |
| WO | WO 01/73553 A1 | 10/2001 |
| WO | WO 01/90859 A1 | 11/2001 |
| WO | WO 02/32047 A1 | 4/2002 |
| WO | WO 2004/044688 A2 | 5/2004 |
| WO | WO 2005/060138 A2 | 6/2005 |
| WO | WO 2005/069823 A2 | 8/2005 |

OTHER PUBLICATIONS

Crosbie, M. et al.; Active Defense of a Computer System using Autonomous Agents; Department of Computer Sciences, Purdue University, West Lafayette, IN; Feb. 15, 1995.

Sequeira, K. et al.; ADMIT: Anomaly-Based Data Mining for Intrusions; Computer Science Department, Rensselaer Polytechnic Institute, Troy, NY.

Lane, T. et al.; An Application of Machine Learning to Anomaly Detection; School of Electrical and Computer Engineering, Purdue University, West Lafayette, IN; Feb. 14.

Abad, C. et al.; Log Correlation for Intrusion Detection: A Proof of Concept; Department of Computer Science, University of Illinois at Urbana-Champaign.

Endler, D.; Intrusion Detection Applying Machine Learning to Solaris Audit Data; Department of Electrical Engineering and Computer Science, Tulane University, New Orleans.

Gonzalez, L.; Current Approaches to Detecting Intrusions; Nova Southeastern University, Graduate School of Computer and Information Sciences, Fort Lauderdale, FL; 2002.

Lane, T. et al.; Detecting the Abnormal: Machine Learning in Computer Security; School of Electrical and Computer Engineering, Purdue University, West Lafayette, IN; Januar.

Smith, Sidney L.; Authenticating Users by Word Association; Dec. 1987; Computers & Security.

Furui, Sadaoki; Cepstral Analysis Technique for Automatic Speaker Verification; IEEE Transactions on Acoustics, Speech, and Signal Processing, vol. ASSp-9, No. 2, Apr. 1981; pp. 254-272; Japan.

Schalk, Thomas B.; Speaker Verification Over the Telephone Network; Feb./Mar. 1991; Dallas, TX; pp. 32-35.

* cited by examiner

ADAPTIVE MULTI-TIER AUTHENTICATION SYSTEM

BACKGROUND OF THE INVENTION

1. Technical Field

The invention relates to user access in a computer environment. More particularly, the invention relates to adapting a secure user login from different originating clients in a computer environment.

2. Description of the Prior Art

Users commonly have their passwords compromised (lost or stolen). Attackers can typically use the stolen username/password to impersonate a user from a remote site. This compromises the service that the attackers infiltrate, which is costly to the service providers.

Most companies allow users access to an Intranet with very little authentication (i.e., a minor password). This is an extreme case where the company knows where the user is coming from; the access point of the user is in an expected area (e.g., inside the company building). When a user accesses a company's Intranet from an unexpected area (e.g., from home), users must use a secure ID (i.e. a major password) to access the first level.

Other mechanisms used to identify people such as biometrics (thumb prints, retinal scanners, etc.) are very expensive and hardware intensive. These type of approaches are difficult to install and use. They are also impractical when applied to the Internet.

The most common solution to avoiding vulnerability to password theft is to require that key material be carried to each authentication environment. Sometimes the key material is stored in a smart card, sometimes it is carried in a floppy (perhaps containing private keys). Either method is typically not user friendly and tend to suffer problems with the loss of the non-password material (or the user forgetting to carry the material).

It would be advantageous to provide an adaptive multi-tier authentication system that automatically adapts to the user's login patterns. It would further be advantageous to provide an adaptive multi-tier authentication system that does not require additional hardware from the service provider.

SUMMARY OF THE INVENTION

The invention provides an adaptive multi-tier authentication system. The system automatically adapts to the user's login patterns. In addition, the invention does not require additional hardware from the service provider by using a query-based security system.

A preferred embodiment of the invention provides secondary tiers of authentication which are used only when the user attempts a connection from a new environment. The invention accepts user input such as login attempts and responses to the system's questions.

User login information such as IP address, originating phone number, or cookies on the user's machine are obtained for evaluation. User/usage profiles are kept for each user.

The user login information is compared to the information from the user/usage profile for the specific user. The user/usage profile contains all of the user information that the user used to establish the account and also the usage profile detailing the user's access patterns.

The trust level of the current user login location is calculated and the invention determines if any additional questions to the user are required. If the trust level is high, then the user is granted access to the system. If the trust level is not high enough, then questions are sent to the user. The user's answers are evaluated and access is granted or denied based on the trust level and answers. The user's profile is updated to reflect the access attempt.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in an adaptive multi-tier authentication system in a computer environment. A system according to the invention automatically adapts to the user's login patterns. In addition, the invention provides a system that does not require additional hardware from the service provider by using a query-based security system.

Users commonly have their passwords compromised (lost or stolen). Attackers can typically use the stolen username/password to impersonate a user from a remote site. This compromises the service that the attackers infiltrate, which is costly to the service providers. The invention makes this type of impersonation more difficult by providing secondary tiers of authentication which are used ONLY when the user attempts a connection from a new environment (i.e., from a new computer, kiosk, etc.).

Figure 1:
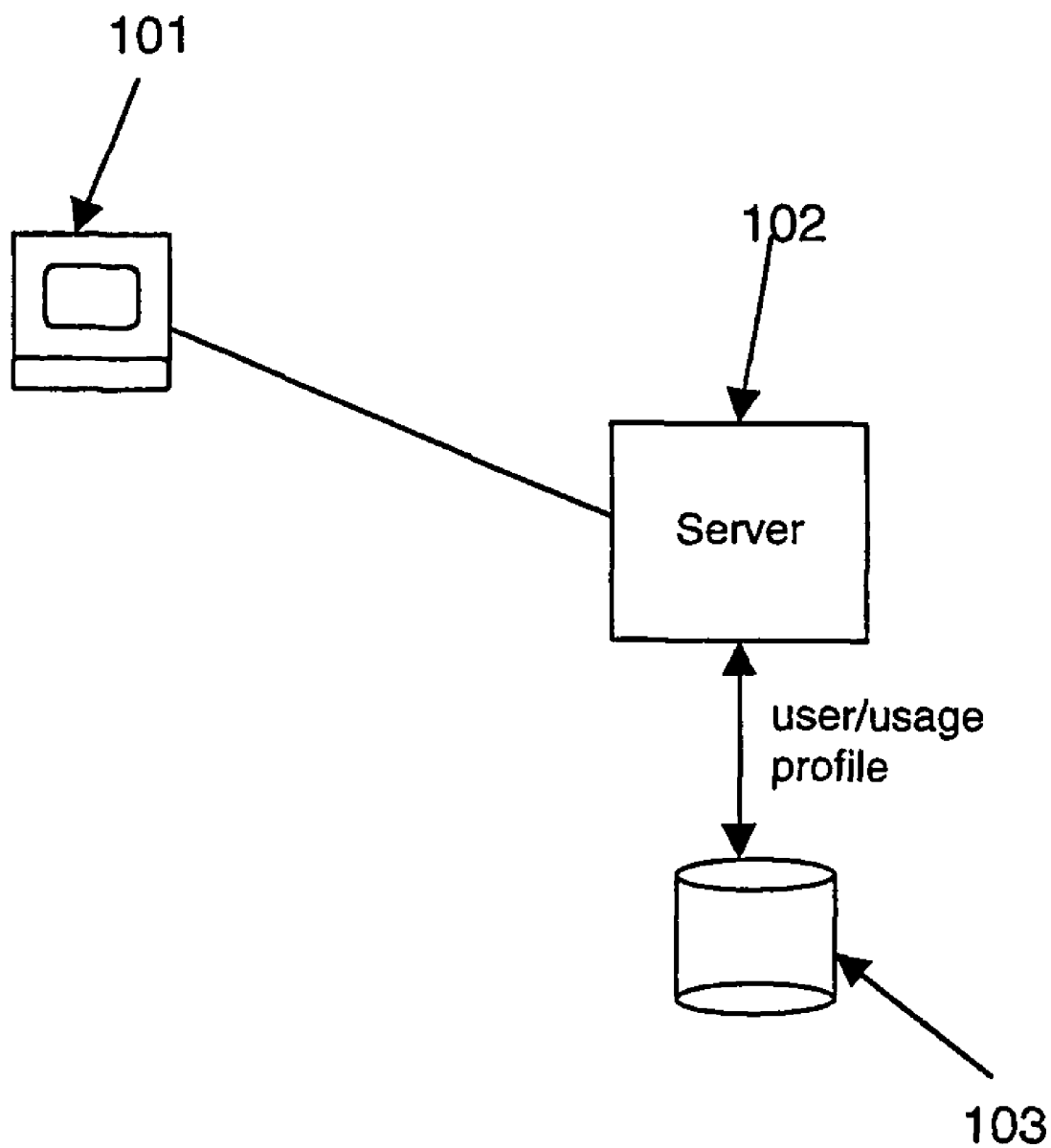
FIG. 1 is a block schematic diagram of a user remote access scenario according to the invention.

Referring to FIG. 1, a simple user interface scenario is shown. The user 101 logs onto the server 102. The server retrieves the user's stored use profile 103. The location where the user 101 is accessing the server is checked against the user's profile to determine a trust level for the session. The server 102 determines if any additional security measures must be taken based on the trust level.

A preferred embodiment of the invention analyzes the user's use of a service and typical access points to augment the trust level of each access point. If the user is always dialing in from home to access a service such as AOL, the invention observes the pattern and, after a while, determines that the trust level is high when the user accesses the service from home. At that point, the invention will allow immediate login into the service without asking for any additional information.

When the user suddenly goes travelling and accesses the service on the road, then the user's trust level is downgraded and more authentication questions are asked before allowing access. For example, the service may tell the user "We are surprised to see you dialing in from California. We just need to do a little extra background check on your identity. How many dogs did you tell us that you have? What are their names?"

Figure 2:
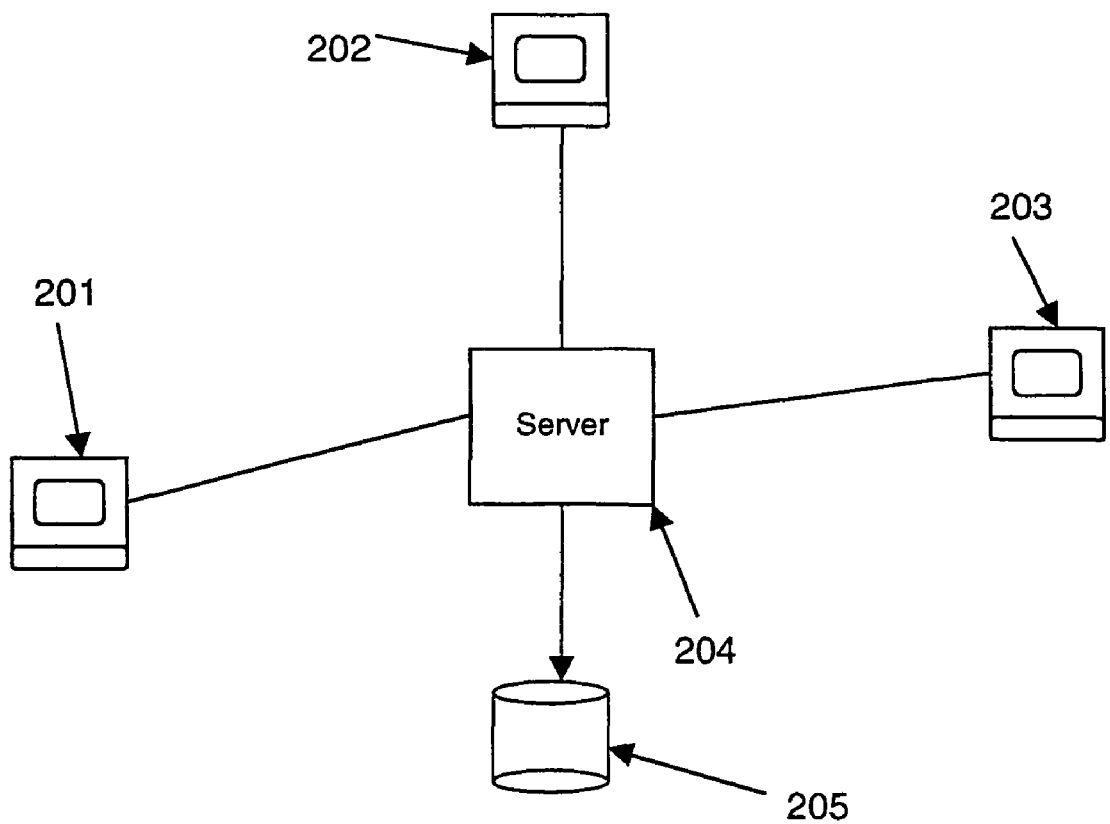
FIG. 2 is a block schematic diagram of a multiple access point example according to the invention.

With respect to FIG. 2, the user may be a salesperson and travels to different cities. This user's patterns may be random at best because his access points are all across the country 201, 202, 203. The server 204 takes this into account and determines that this is the user's normal pattern. The server 204 records this fact in the user's profile 205.

However, if the user logs in to the server 204 at one location 201 and then another user logs in using the same identity at another location 203, the server 204 will immediately downgrade the trust level of the second location and ask more authentication questions. This also applies to the situation when a user logs in the United States, for example, and a similar login occurs in Japan five hours later. The invention knows that the time frame is improbable.

The invention automates the process of tracking information such as IP addresses, where the user dialed in from, and the access times. A profile of the combination of data is used to as a basis to determine the level of trust. For example, the invention uses the following criteria to adapt authentication for a system:

Where the user is dialing in from (e.g., phone number).
Type of machine being used (e.g., Mac or PC).
Operating system on the machine.
Cookies/tags that are on the machine.
IP address (e.g., same IP address or same subnet).

When a user logs on, some distinct aspect of the computer is recorded. In the typical case, a random token is written into memory, or onto the disk of the client computer. Logon proceeds as usual ONLY if the existing token is located on the computer used for the login (e.g., an identifying cookie would be used on a per-computer basis for HTTP transactions). When the element that is used to identify the computer does not match the user's "standard list of computers used" then some secondary questions are asked as described above (e.g., "What is your birthday?", "What is your home phone number?") before completing the authentication.

The system adapts and learns new sites that the user logs in from, and then proceeds to use the minimal username/ password from those sites only. Other techniques could be used to identify the logon environment as listed above (i.e., IP address or dial in line), but the creation of a unique mark (file, cookie, etc.) ensures verification of the environment.

The user is not burdened with having to carry anything with him that could to be lost or stolen (e.g., smart cards). This approach is analogous to traditional human identification systems, where, when the user is known, then additional proof of ID is not requested.

The user immediately knows when something is wrong when the invention suddenly asks for more information than usual. For example, if the user logs in from home, which is a normal situation, and the system asks for more information than normal, such as the user's dog's name. The unusual request would be an indicator to the user that something may be wrong, prompting the user to call into customer support to get more information.

Figure 3:
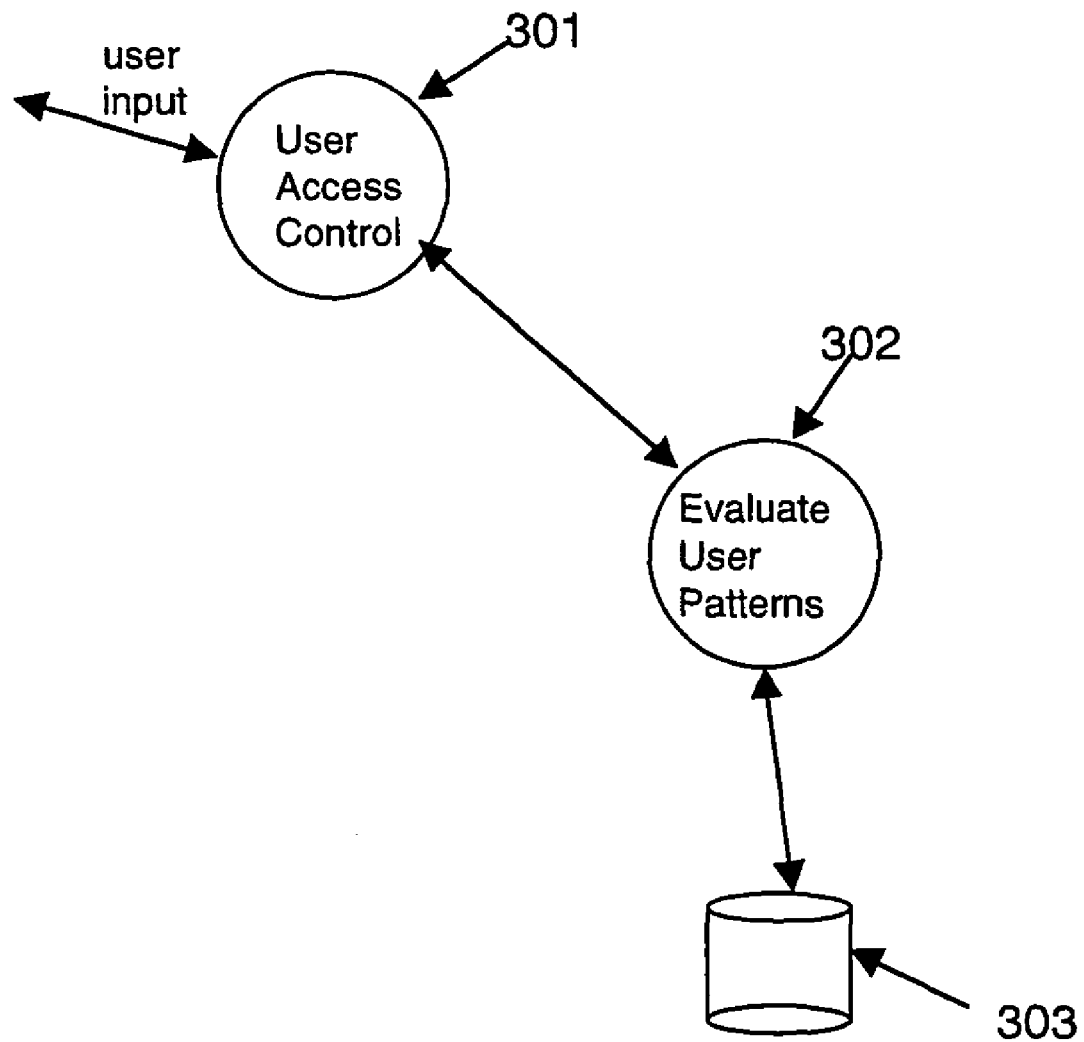
FIG. 3 is a block schematic diagram of a task viewpoint of the invention according to the invention.

Referring to FIG. 3, the User Access Control module 301 accepts user input such as login attempts and responses to the system's questions. The User Access Control module 301 has the responsibility to search and check for information such as IP address, originating phone number, or cookies on the user's machine. The Evaluate User Patterns module 302 takes the information obtained from the User Access Control module 301 and compares it to the usage information from the user/usage profile 303 for the specific user. The user/usage profile contains all of the user information that the user used to establish the account and also the usage profile detailing the user's access patterns.

The trust level of the current user login location is calculated and the Evaluate User Patterns module 302 determines if any additional questions to the user are required. Questions are sent through the User Access Control module 301 to the user. The user's answers are relayed from the User Access Control module 301 back to the Evaluate User Patterns module 302. The Evaluate User Patterns module 302 grants or denies access based on the trust level and answers for any questions that it asked. The Evaluate User Patterns module 302 updates the user/usage profile 303 for the user with the information just obtained.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for secure access in a computer environment based upon user log in patterns, comprising the steps of:
when a user logs in, accessing user login information related to a user login request on a machine used by said user;
said user login information including any of where the user is dialing in from, the type of machine being used, the operating system on said machine, cookies/tags that are on said machine, and IP address;
providing a profile for said user including information relating to user login patterns, user personal information, and trust levels for access locations across sessions;
comparing said user login information to the information from the profile for the specific user;
determining a trust level for the current user login location based on said user login information, wherein said determining step recognizes and identifies user login patterns;
issuing questions to the user relating to the user's personal information if said user attempts a connection from a new environment; and
updating said profile for said user for each session.

2. The process of claim 1, further comprising the step of:
installing a cookie/tag onto the machine that the user is logging in from.

3. The process of claim 1, wherein if said trust level is low, then issuing questions to the user relating to the user's personal information.

4. The process of claim 3, wherein if said questions are answered correctly, then granting access to the user.

5. The process of claim 3, wherein if said questions are answered incorrectly, then denying access to the user.

6. The process of claim 1, wherein if said trust level is high, then granting access to the user.

7. The apparatus of claim 6, further comprising:
a module for installing a cookie/tag onto the machine that the user is logging in from.

8. The apparatus of claim 6, wherein if said trust level is low, then issuing questions to the user relating to the user's personal information.

9. The apparatus of claim 8, wherein if said questions are answered correctly, then granting access to the user.

10. The apparatus of claim 8, wherein if said questions are answered incorrectly, then denying access to the user.

11. The apparatus of claim 6, wherein if said trust level is high, then granting access to the user.

12. An apparatus for an adaptive secure access system in a computer environment, comprising:
a module for accessing user login information related to a user login request on a machine used by a user when said user logs in;

said user login information including any of where the user is dialing in from, the type of machine being used, the operating system on said machine, cookies/tags that are on said machine, and IP address;

a profile for said user including information relating to user login patterns across sessions, user personal information, and trust levels for access locations;

a module for comparing said user login information to the information from the profile for the specific user;

a module for determining a trust level for the current user login location based on said user login information, wherein said module for determining a trust level recognizes and identifies user login patterns;

a module for issuing questions to the user relating to the user's personal information if said user attempts a connection from a new environment; and a module for updating said profile for said user for each session.

13. A program storage medium readable by a computer, tangibly embodying a program of instructions executable by the computer to perform method steps for an adaptive secure access system in a computer environment, comprising the steps of:

when a user logs in, accessing user login information related to a user login request on a machine used by said user;

said user login information including any of where the user is dialing in from, the type of machine being used, the operating system on said machine, cookies/tags that are on said machine, and IP address;

providing a profile for said user including information relating to user login patterns, user personal information, and trust levels for access locations across sessions;

comparing said user login information to the information from the profile for the specific user;

determining a trust level for the current user login location based on said user login information, wherein said determining step recognizes and identifies user login patterns;

issuing questions to the user relating to the user's personal information if said user attempts a connection from a new environment; and updating said profile for said user for each session.

14. The method of claim 13, further comprising the step of:

installing a cookie/tag onto the machine that the user is logging in from.

15. The method of claim 13, wherein if said trust level is low, then issuing questions to the user relating to the user's personal information.

16. The method of claim 15, wherein if said questions are answered correctly, then granting access to the user.

17. The method of claim 15, wherein if said questions are answered incorrectly, then denying access to the user.

18. The method of claim 13, wherein if said trust level is high, then granting access to the user.

* * * * *